(12) United States Patent
Adam et al.

(10) Patent No.: US 11,001,248 B2
(45) Date of Patent: May 11, 2021

(54) METHOD FOR ENHANCING POWERTRAIN EFFICIENCY AND DRIVELINE QUALITY THROUGH DYNAMIC MISSION PLANNING OPTIMIZATION

(71) Applicant: GM Global Technology Operations LLC, Detroit, MI (US)

(72) Inventors: Paul A. Adam, Milford, MI (US); Gabriel T. Choi, Novi, MI (US); Xiaofeng F. Song, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 359 days.

(21) Appl. No.: 16/154,181

(22) Filed: Oct. 8, 2018

(65) Prior Publication Data

US 2020/0108818 A1    Apr. 9, 2020

(51) Int. Cl.
| | |
|---|---|
| *B60W 20/12* | (2016.01) |
| *B60W 30/188* | (2012.01) |
| *G05D 1/02* | (2020.01) |
| *B60W 10/04* | (2006.01) |
| *B60W 40/06* | (2012.01) |
| *B60W 50/00* | (2006.01) |
| *B60W 50/04* | (2006.01) |
| *B60W 40/04* | (2006.01) |

(52) U.S. Cl.
CPC .......... *B60W 20/12* (2016.01); *B60W 30/188* (2013.01); *G05D 1/0217* (2013.01); *B60W 10/04* (2013.01); *B60W 40/04* (2013.01); *B60W 40/06* (2013.01); *B60W 2050/0078* (2013.01); *B60W 2050/046* (2013.01); *G05D 1/0278* (2013.01)

(58) Field of Classification Search
None
See application file for complete search history.

(56) References Cited

U.S. PATENT DOCUMENTS

| | | | | |
|---|---|---|---|---|
| 8,036,785 | B2 * | 10/2011 | Maguire | G01C 21/3469 701/22 |
| 8,543,272 | B2 * | 9/2013 | Yu | B60W 20/12 701/22 |
| 9,981,560 | B2 * | 5/2018 | Zinner | B60W 30/18109 |
| 10,392,002 | B2 * | 8/2019 | Leone | B60W 30/18018 |
| 10,829,108 | B2 * | 11/2020 | Kim | B60W 20/40 |

(Continued)

*Primary Examiner* — Nicholas K Wiltey
(74) *Attorney, Agent, or Firm* — Quinn IP Law (57) ABSTRACT

A powertrain optimization method is used to identify the optimal torque operating range. The method for controlling the vehicle includes: receiving, by a planning controller, a trip plan based on an input from a vehicle-operator, wherein the trip plan is indicative of a planned trip; determining, by the planning controller, a current location of the vehicle using a Global Navigation Satellite System (GNSS) of the vehicle; determining, by the planning controller, a geography of the planned trip using map data from a map database; determining, by the planning controller, a target speed profile for the vehicle as a function of the trip plan, the geography of the planned trip, and a predetermined, optimal acceleration range; determining, by an adaptive cruise controller, a torque request as a function of the target speed profile, a predetermined-optimal torque range, and a current speed of the vehicle.

18 Claims, 4 Drawing Sheets

(56) References Cited

U.S. PATENT DOCUMENTS

| | | | |
|---|---|---|---|
| 2002/0188387 A1* | 12/2002 | Woestman | B60K 6/445 701/22 |
| 2009/0024263 A1* | 1/2009 | Simon, Jr. | F02D 41/1497 701/22 |
| 2011/0144887 A1* | 6/2011 | Whitney | F02D 37/02 701/103 |
| 2012/0286052 A1* | 11/2012 | Atluri | B60K 16/00 237/28 |
| 2015/0239442 A1* | 8/2015 | Yamakado | B60L 7/18 701/70 |
| 2015/0258984 A1* | 9/2015 | Atluri | B60K 6/485 701/22 |
| 2015/0369620 A1* | 12/2015 | Kim | G01C 21/3484 701/521 |
| 2016/0101780 A1* | 4/2016 | Park | B60W 50/0097 701/70 |
| 2016/0167641 A1* | 6/2016 | Yoon | G08G 1/09626 701/22 |
| 2018/0045527 A1* | 2/2018 | Baker | G01C 21/3617 |
| 2018/0118191 A1* | 5/2018 | Park | F16H 61/0213 |
| 2018/0170356 A1* | 6/2018 | Lee | B60W 40/09 |
| 2018/0170357 A1* | 6/2018 | Lee | B60W 20/40 |
| 2018/0172462 A1* | 6/2018 | De Nunzio | G01C 21/3446 |
| 2018/0186360 A1* | 7/2018 | Jo | B60W 10/08 |
| 2018/0201262 A1* | 7/2018 | Yoon | B60W 10/06 |
| 2018/0231389 A1* | 8/2018 | De Nunzio | B60W 50/14 |
| 2018/0264970 A1* | 9/2018 | Lor | B60L 15/20 |
| 2018/0264971 A1* | 9/2018 | Lor | B60L 15/20 |
| 2018/0281775 A1* | 10/2018 | Lee | B60K 6/442 |
| 2018/0297578 A1* | 10/2018 | Park | B60K 6/485 |
| 2019/0001960 A1* | 1/2019 | Lee | B60W 10/06 |
| 2019/0126910 A1* | 5/2019 | Kim | F01N 9/00 |
| 2019/0179335 A1* | 6/2019 | Cha | B60W 30/18 |
| 2019/0375394 A1* | 12/2019 | Maleki | B60W 50/0097 |
| 2019/0375407 A1* | 12/2019 | Maleki | B60W 10/04 |
| 2019/0384322 A1* | 12/2019 | Luckevich | B60W 10/18 |
| 2020/0070818 A1* | 3/2020 | Tominaga | B60W 30/18 |
| 2020/0089241 A1* | 3/2020 | Kao | G01C 21/3492 |
| 2020/0089247 A1* | 3/2020 | Shkurti | G05D 1/0257 |
| 2020/0108818 A1* | 4/2020 | Adam | G05D 1/0217 |
| 2020/0156480 A1* | 5/2020 | Park | H02P 23/0009 |
| 2020/0307542 A1* | 10/2020 | Engstrom | F16H 61/0213 |

* cited by examiner

METHOD FOR ENHANCING POWERTRAIN EFFICIENCY AND DRIVELINE QUALITY THROUGH DYNAMIC MISSION PLANNING OPTIMIZATION

INTRODUCTION

The present disclosure relates to a method for enhancing powertrain efficiency and driveline quality through dynamic mission planning optimization.

SUMMARY

The present disclosure describes a powertrain optimization technique to identify the optimal torque operating range and communicate such range to the advanced driver-assistance system (ADAS) control system. The optimal torque range is then translated into an optimal speed range. This information is then used to construct current and future motion plans as possible. The current and planned torque demand information is then communicated to the powertrain to allow a closed loop optimization. The optimized torque plan is communicated from the ADAS to the powertrain controllers to optimize control for improved driveline response (e.g., prestige gear selection, engine torque management, enter/exit Deceleration Fuel Cut-Off (DFCO), etc.).

The present disclosure describes methods and systems that utilize external sensing, behavioral planning, and situation prediction capabilities of the ADAS of the vehicle to compute a torque request plan extending from present out to event horizon. Further, the presently disclosed method and system use energy planning algorithms for efficiency and driveline response quality as additional factors in motion and behavioral planning of the vehicle. The presently disclosed method and systems take advantage of the synergy between powertrain controls and autonomous behavior planner.

For a hybrid vehicle, the target state of charge (SOC) of the battery is determined by considering, but not limiting to: battery capacity, engine characteristics including torque-speed and efficacity profile, traction motor characteristics, DC/DC converter capability, outside temperature, battery temperature, engine and transmission temperature, driving history, among others. In the presently disclosed method and system, the ADAS plan additionally considers speed plan for the near future, terrain information, dynamic traffic situation, and vehicle operator's selected speed. As a result, the vehicle is capable of achieving a higher than usual SOC target for predicted long climbs on an elevation. Further, by using this method and system, the vehicle is capable of achieving a lower than usual SOC target for predestined long downhill driving. To optimize the SOC for a given driver torque request, the SOC Delta is the target SOC minus the actual SOC. For high SOC Delta, the control system selects an operating point that generally consumes less fuel and less battery power by discouraging fuel consumption (i.e., positive cost on fuel) and discouraging battery charge and encouraging discharge (i.e., negative cost and battery power). For low SOC Delta, the control system selects an operating point that generally consumes more fuel and less battery power by encouraging fuel consumption and encouraging battery charge and discouraging discharge.

The method for controlling the vehicle (and optimizing the powertrain efficiency) includes: receiving, by a planning controller, a trip plan based on an input from a vehicle-operator, wherein the trip plan is indicative of a planned trip; determining, by the planning controller, a current location of the vehicle using a Global Navigation Satellite System, (GNSS) of the vehicle; determining, by the planning controller, a geography of the planned trip using map data from a map database; determining, by the planning controller, a target speed profile for the vehicle as a function of the trip plan, the geography of the planned trip, and a predetermined, optimal acceleration range; determining, by an adaptive cruise controller, a torque request as a function of the target speed profile, a predetermined-optimal torque range, and a current speed of the vehicle; determining, by the adaptive cruise controller, an updated-optimal acceleration range as a function of a current torque capacity of the vehicle, a predetermined-optimal torque range, and a vehicle-operator target speed; updating the target speed profile as a function of the updated-optimal acceleration range; determining an axle torque request as a function of the torque request and an engine torque capacity of the vehicle; determining an updated-optimal torque range as a function of the engine torque capacity of the vehicle; updating the updated-optimal torque range as a function of the engine torque capacity of the vehicle, and an engine torque capability of the vehicle, and a transmission state of a transmission of the vehicle; and controlling, by a transmission controller, the transmission of the vehicle based on the axle torque request, a current transmission output speed of the transmission, and the engine torque capacity of the vehicle.

The geography of the planned trip may include an upcoming terrain data, and the target speed profile is determined based on the upcoming terrain data. The target speed profile is determined as a function of a vehicle-operator set speed. The updated-optimal torque range is determined based on the engine torque capacity of the vehicle, the engine torque capability of the vehicle, and the transmission state of the transmission of the vehicle. Controlling, by the transmission controller, the transmission of the vehicle includes generating a transmission shift command to adjust the transmission state such that the transmission operates in an updated-transmission state. The method may further include updating the updated-optimal torque range as a function of the engine torque capacity of the vehicle, the engine torque capability of the vehicle, and the updated-transmission state of a transmission of the vehicle.

The method may further include: determining a current air-fuel ratio of the vehicle; and determining, by an engine controller, the engine torque capacity as a function of the current air-fuel ratio of the vehicle. The method may further include determining the engine torque capability as a function of a maximum air-fuel ratio of the vehicle. The method may further include generating a throttle command to control a throttle of the vehicle.

The present disclosure also describes a vehicle. The vehicle includes a transmission, an internal combustion engine coupled to the transmission, and a Global Navigation Satellite System (GNSS) configured to determine a current location of the vehicle. Also, the vehicle includes a map database including map data and an adaptive cruise controller in communication with the map database and the GNSS. The adaptive cruise controller is programmed to: determine the current location of the vehicle using the GNSS; determine a geography of a planned trip using the map data, wherein the geography of the planned trip includes an upcoming terrain data; determine a target speed profile for the vehicle as a function of the trip plan, the upcoming terrain data, an vehicle-operator set speed, and a predetermined, optimal acceleration range; determine a torque request as a function of the target speed profile, a predetermined-optimal torque range, and a current speed of the vehicle; determine an updated-optimal acceleration range as a function of a current torque capacity of the vehicle, a predetermined-optimal torque range, and a vehicle-operator target speed; update the target speed profile as a function of the updated-optimal acceleration range; determine an axle torque request as a function of the torque request and an engine torque capacity of the vehicle; determine an updated-optimal torque range as a function of the engine torque capacity of the vehicle; and update the updated-optimal torque range as a function of the engine torque capacity of the vehicle, and an engine torque capability of the vehicle, and a transmission state of a transmission of the vehicle. The vehicle further includes a transmission controller in communication with the transmission and the adaptive cruise controller. The transmission controller is programmed to control the transmission of the vehicle based on the axle torque request, a current transmission output speed of the transmission, and the engine torque capacity of the vehicle, and the transmission controller is programmed to generate a transmission shift command to adjust the transmission state such that the transmission operates in an updated-transmission state. The vehicle further includes a planning controller programmed to generate a trip plan based on an input from a vehicle-operator. The trip plan is indicative of a planned trip. The vehicle further includes an engine controller programmed to: determine a current air-fuel ratio of the vehicle; determine the engine torque capacity as a function of the current air-fuel ratio of the vehicle; determine the engine torque capability as a function of a maximum air-fuel ratio of the vehicle; and generate a throttle command to control a throttle of the vehicle. The adaptive cruise controller is further programmed to update the updated-optimal torque range as a function of the engine torque capacity of the vehicle, and the engine torque capability of the vehicle, and the updated-transmission state of a transmission of the vehicle. The vehicle includes a plurality of sensors. At least one of the sensors is configured to collect dynamic traffic information and transmit the dynamic traffic information to the planning controller.

The above features and advantages and other features and advantages of the present teachings are readily apparent from the following detailed description of the best modes for carrying out the teachings when taken in connection with the accompanying drawings.

DETAILED DESCRIPTION

Figure 1:
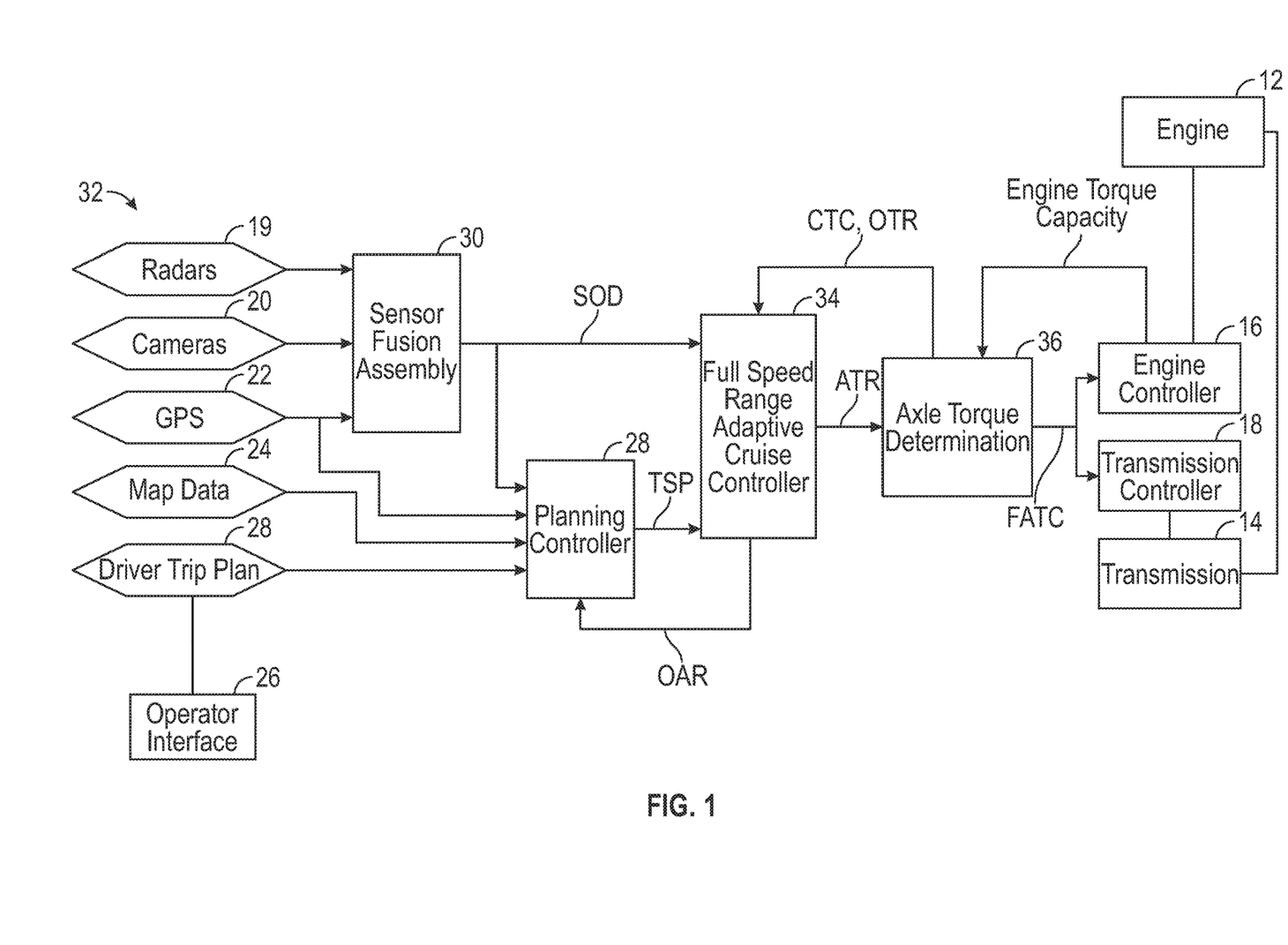
FIG. 1 is a block diagram of a vehicle.

Referring to the drawings, wherein like reference numbers correspond to like or similar components throughout the several figures, and beginning with FIG. 1, the vehicle 10 includes an internal combustion engine 12 and a transmission 14 mechanically coupled to the internal combustion engine 12. The vehicle 10 may be a hybrid vehicle. In the depicted embodiment, the vehicle 10 further includes an engine controller 16 and a transmission controller 18 that may include hardware elements such as a processor, circuitry including but not limited to a timer, oscillator, analog-to-digital (A/D) circuitry, digital-to-analog (D/A) circuitry, a digital signal processor, and suitable input/output (I/O) devices and other signal conditioning and/or buffer circuitry. The memory may include tangible, non-transitory memory such as read-only memory (ROM), e.g., magnetic, solid-state/flash, and/or optical memory, as well as sufficient amounts of random-access memory (RAM), electrically-erasable programmable read-only memory (EEPROM), and the like. The method 100 may be recorded in memory and executed by the processor of the engine controller 16 and/or the transmission controller 18 in the overall control of the vehicle 10. The engine controller 16 programmed to control the operation of the internal combustion engine 12. The engine controller 16 is in communication with the internal combustion engine 12 and is programmed to control the operation of the internal combustion engine 12. The transmission controller 18 is in communication with the transmission 14 and is programmed to control the operation of the transmission 14.

The vehicle 10 further includes one or more radars 19, such as LIDAR (Light Detection and Ranging) and/or RADAR (Radio Detection and Ranging) sensing devices for detecting other objects around the vehicle 10 and determine their range, angle, distance, and/or velocity. To do so, RADAR employs radio waves, whereas LIDAR employs pulsed laser light. The vehicle 10 further includes one or more cameras 20 configured to capture images of the surroundings of the vehicle 10. The vehicle 10 further includes a Global Navigation Satellite System (GNSS) 22 configured to (at least) determine the current location of the vehicle 10. The GNSS 22 may include an antenna and/or a receiver for reciting positioning data from satellites. The vehicle 10 further includes a map database 24 including map data. The map data is indicative of map information. The vehicle 10 further includes a vehicle-operator interface 26 configured to receive input from the vehicle operator. As non-limiting examples, the vehicle-operator interface 26 may include a touch-screen or button capable of receiving inputs from the vehicle-operator. The input received through the vehicle-operator interface 26 may include, for example, a destination. Based on the input from the vehicle-operator (through the vehicle-operator interface 26), a trip plan 28 is generated by, for example, a planning controller 28. The trip plan 28 is indicative of a planned trip to the destination.

The planning controller 28 of the vehicle 10 may include hardware elements such as a processor, circuitry including but not limited to a timer, oscillator, analog-to-digital (A/D) circuitry, digital-to-analog (D/A) circuitry, a digital signal processor, and a suitable input/output (I/O) devices and other signal conditioning and/or buffer circuitry. The memory may include tangible, non-transitory memory such as read-only memory (ROM), e.g., magnetic, solid-state/ flash, and/or optical memory, as well as sufficient amounts of random-access memory (RAM), electrically-erasable programmable read-only memory (EEPROM), and the like.

The vehicle 10 further includes a sensor fusion assembly 30 to fuse and assemble the sensors 32 (e.g., radars 19, camera 20, GNSS 22) together. The sensor fusion assembly collects the data generated by the sensors 32 and transmits the collected data to the full speed range adaptive cruise controller (FSRACC) 34. The FSRACC 34 may simply be referred to as the adaptive cruise controller or the advanced driver-assistance system (ADAS). The FSRACC 34 may include hardware elements such as a processor (P), circuitry including but not limited to a timer, oscillator, analog-to-digital (A/D) circuitry, digital-to-analog (D/A) circuitry, a digital signal processor, and suitable input/output (I/O)

devices and other signal conditioning and/or buffer circuitry. The memory (M) may include tangible, non-transitory memory such as read-only memory (ROM), e.g., magnetic, solid-state/flash, and/or optical memory, as well as sufficient amounts of random-access memory (RAM), electrically-erasable programmable read-only memory (EEPROM), and the like. The data collected by the sensors 32 and transmitted to the FSRACC 34 may be information of the objects surrounding the vehicle 10 including dynamic traffic information (i.e., the surrounding objects data SOD). The data collected by the sensors 32 may also be transmitted to the planning controller 28. As discussed below, the FSRACC 34 may determine the optimal acceleration range OAR and transmit the optimal acceleration range OAR to the planning controller 28. In turn, the planning controller 28 is programmed to determine the target speed profile over the event horizon TSP based on the map data and the trip plan (including the destination inputted by the vehicle-operator).

The FSRACC 34 is programmed to determine an axle torque request ATR to achieve the target speed (in accordance with the target speed profile TSP). The axle torque request ATR may be determined based on a current torque capacity CTC and an optimal torque range OTR. During the first cycle of the method 100, the optimal torque range OTR is a predetermined-optimal torque range derived by testing the vehicle 10. Then, the FSRACC 34 communicates the axle torque request ATR to an axle torque determination algorithm 36 for determining the axle torque for the vehicle 10. The axle torque determination algorithm 36 determines and updates the current torque capacity CTC and the optimal torque range OTR. Further, the updated current torque capacity CTC and the optimal torque range OTR are communicated to the FSRACC 34. After determining the axle torque, the axle torque determination algorithm 36 sends the final axle torque command FATC to the engine controller 16 and the transmission controller 18. The engine controller 16 then controls the operation of the internal combustion engine 12 based on the final axle torque command TC. Likewise, the transmission controller 18 controls the operation of the transmission 14 based on the final axle torque command TC.

Figure 2:
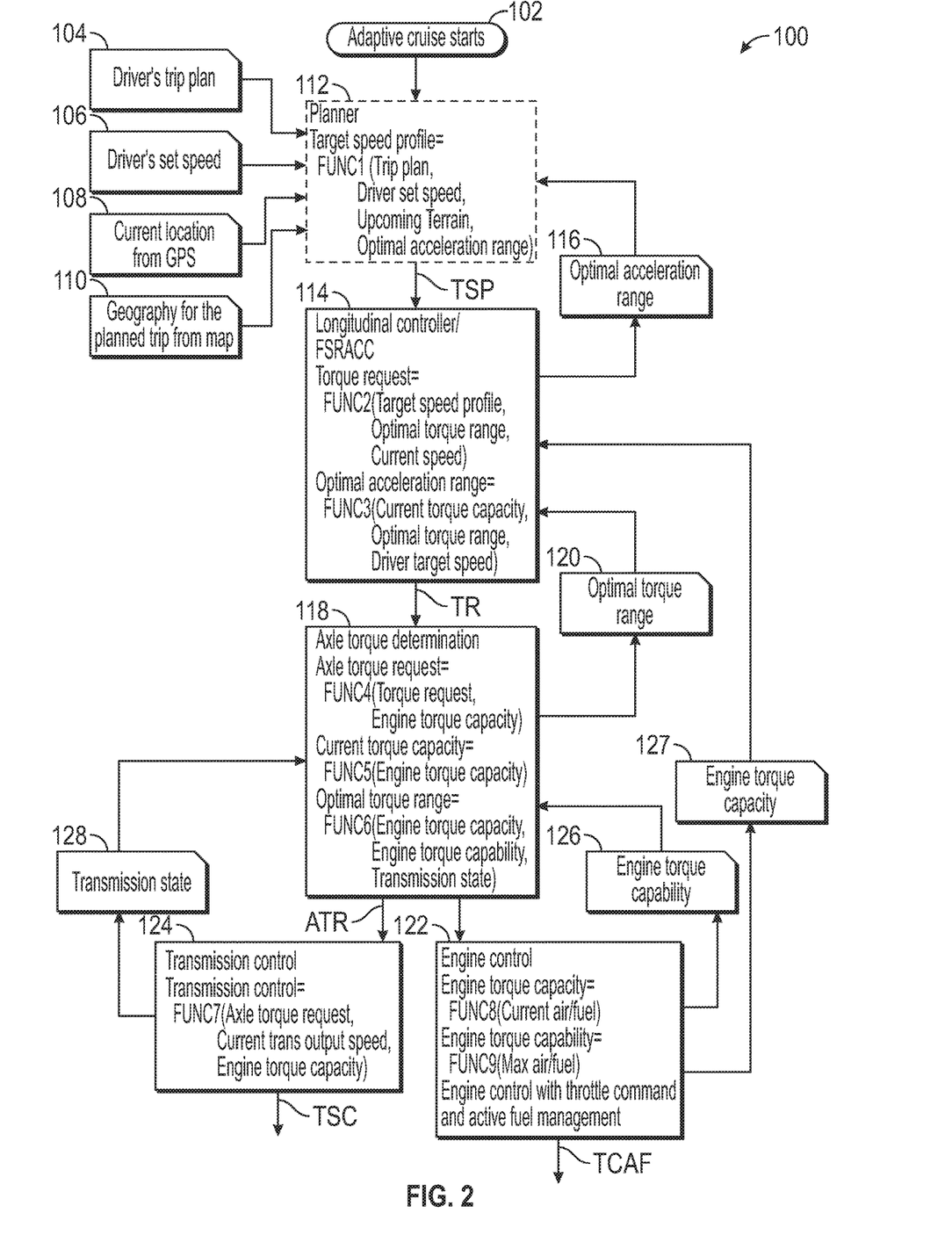
FIG. 2 is a method for controlling the vehicle of FIG. 1.

With reference to FIG. 2, a method 100 for controlling the vehicle 10. Specifically, the method 100 is used for improving powertrain efficiency and driveline quality through dynamic planning optimization. The method 100 begins at block 102, wherein the adaptive cruise starts. Then, the method 100 proceeds to block 104. At block 104, the vehicle-operator input the the trip plan (including his/her destination) through the vehicle-operator interface 26. Also, the method 100 includes block 106, in which the vehicle-operator inputs a vehicle-operator set speed through the vehicle-operator interface 26. The method 100 also includes block 108, in which the GNSS 22 determines the current location of the vehicle 10. The method 100 also includes block 110, in which the geography (including the upcoming terrain data) of the planned trip is determined using the map data. Then, the method 100 proceeds to block 112.

At block 112, the planner (i.e., the planning controller 28) receives the vehicle-operator trip plan though the vehicle-operator interface 26, the set speed as set by the vehicle-operator through the vehicle-operator interface 26, the current location of the vehicle 10 as determined by the GNSS 22, and the geography (including the upcoming terrain data) of the planned trip from the map database 24. The planner (i.e., the planning controller 28) determines the target speed profile TSP over the event horizon as a function of the trip plan, the set speed, the geography of the planned trip (including the upcoming terrain data), and the optimal acceleration range OAR. It is contemplated that the target speed profile TSP may be determined solely based on the trip plan, the upcoming terrain data, and the optimal acceleration range OAR. The planning controller 28 may employ a look-up table (which is generated by testing the vehicle 10) to determine the target speed profile TSP. During the first cycle of the method 100, the planning controller 28 employs a predetermined, optimal acceleration range OAR for determine the target speed profile TSP. The predetermined, optimal acceleration range OAR may be determined by testing the vehicle 10. At block 112, the planning controller 28 communicates the target speed profile TSP to the FSRACC 34 (which may also be referred to as the longitudinal controller). In other words, at block 114, the FSRACC 34 receives the target speed profile TSP from the planning controller 28.

At block 114, the FSRACC 34 determines the torque request TR as a function of the target speed profile TSP, an optimal torque range OTR (such as the predetermined-optimal torque range during the first cycle), and a current speed of the vehicle 10. The current speed of the vehicle 10 may be determined using a wheel rotational speed sensor of the vehicle 10. The FSRACC 34 may use a look-up table to determine the torque request. The look-up table may be developed by testing the vehicle 10. It is contemplated that the torque request TR may be determined solely based on the target speed profile TSP, the optimal torque range OTR, and the current speed of the vehicle 10. At block 114, the FSRACC 34 may also determine the optimal acceleration range as a function of the current torque capacity CTC, the optimal torque range OTR, and a vehicle-operator target speed (which may be determined through inputs received through the vehicle-operator interface 26). At block 116, the updated, optimal acceleration range (determined in block 114) is communicated to the block 112, thereby allowing the planning controller 28 to determine an updated, target speed profile TSP. Also at block 114, the FSRACC 34 communicates the torque request TR to block 118. After block 114, the method 100 proceeds to block 118.

At block 118, the FSRACC 34 determines the axle torque request ATC as a function of the torque request (determined in block 114) and an engine torque capacity. It is contemplated that the axle torque request ATC may be determined solely based on the engine torque capacity and the torque request determined in block 114. At block 118, the FSRACC 34 (or other suitable controller) determines the axle torque request using a look-up table, which can be developed by testing the vehicle 10. Also at block 118, the FSRACC 34 (or other suitable controller) determines a current torque capacity CTC as a function of the engine torque capacity. The FSRACC 34 (or other suitable controller) may determine the current torque capacity CTC using a look-up table, which may be determined by testing the vehicle 10. Also at block 118, the FSRACC 34 (or other suitable controller) determines an updated-optimal torque range OTR as a function of the engine torque capacity, the engine torque capability, and the transmission state of the transmission 14. It is contemplated that the FSRACC 34 (or other suitable controller) may determine the updated-optimal torque range OTR solely based on the engine torque capacity, the engine torque capability, and the transmission state. At block 120, the updated-optimal torque range OTR is communicated to block 114, allowing the FSRACC 34 (or other suitable controller) to update the optimal acceleration range OAR and the torque request. Then, the method 100 proceeds to blocks 122 and 124.

At block 122, the engine controller 16 determines the engine torque capacity as a function of the current air-fuel ratio of the internal combustion engine 12 using information, for example, from an oxygen sensor coupled to the internal combustion engine 12. It is contemplated that the engine torque capacity may be determined solely based on the current air-fuel ratio. Also at block 122, the engine controller 16 determines the engine torque capability as a function of the maximum air-fuel ratio of the internal combustion engine 12. The maximum air-fuel ratio is a predetermined value and may be stored on the engine controller 16. Also at block 122, the engine controller 16 generates a throttle command (with active fuel management) TCAF to control the operation of the internal combustion engine 12. The engine controller 16 communicates the updated-engine torque capability to the FSRACC 34 at block 126, thereby allowing the FSRACC 34 (or other suitable controller) to determine an updated-optimal torque range, an updated-current torque capacity CTC, and an updated-axle torque request ATR. Also at block 127, the updated-engine torque capacity is communicated to the FSRACC 34, thereby allowing the FSRACC 34 to determine an updated-optimal acceleration range OAR.

At block 124, the transmission controller 18 determines a transmission control (e.g., a transmission state or an updated-transmission state) as a function of the axle torque request ATR, the current transmission output speed, and the engine torque capacity. The current transmission output speed may be determined using a transmission output speed sensor coupled to the transmission 14. The current engine torque capacity is determined at block 122. The axle torque request ATR is determined at block 118. Thus, the transmission controller 18 receives the engine torque capacity from the FSRACC 34 (or other suitable controller such as the engine controller 16). The transmission controller 18 may determine the transmission state (or an updated-transmission state) using a look-up table developed by testing the vehicle 10. The transmission controller 18 then communicates the updated-transmission state at block 128 to the FSRACC 34, thereby allowing the FSRACC 34 to determine an updated-optimal torque request. In the present disclosure, the "transmission state" means the speed ratio and/or the gear ratio of the transmission 14. Also at block 124, the transmission controller 18 generates a transmission shift command TSC to control the operation of the transmission 14.

Figure 3:
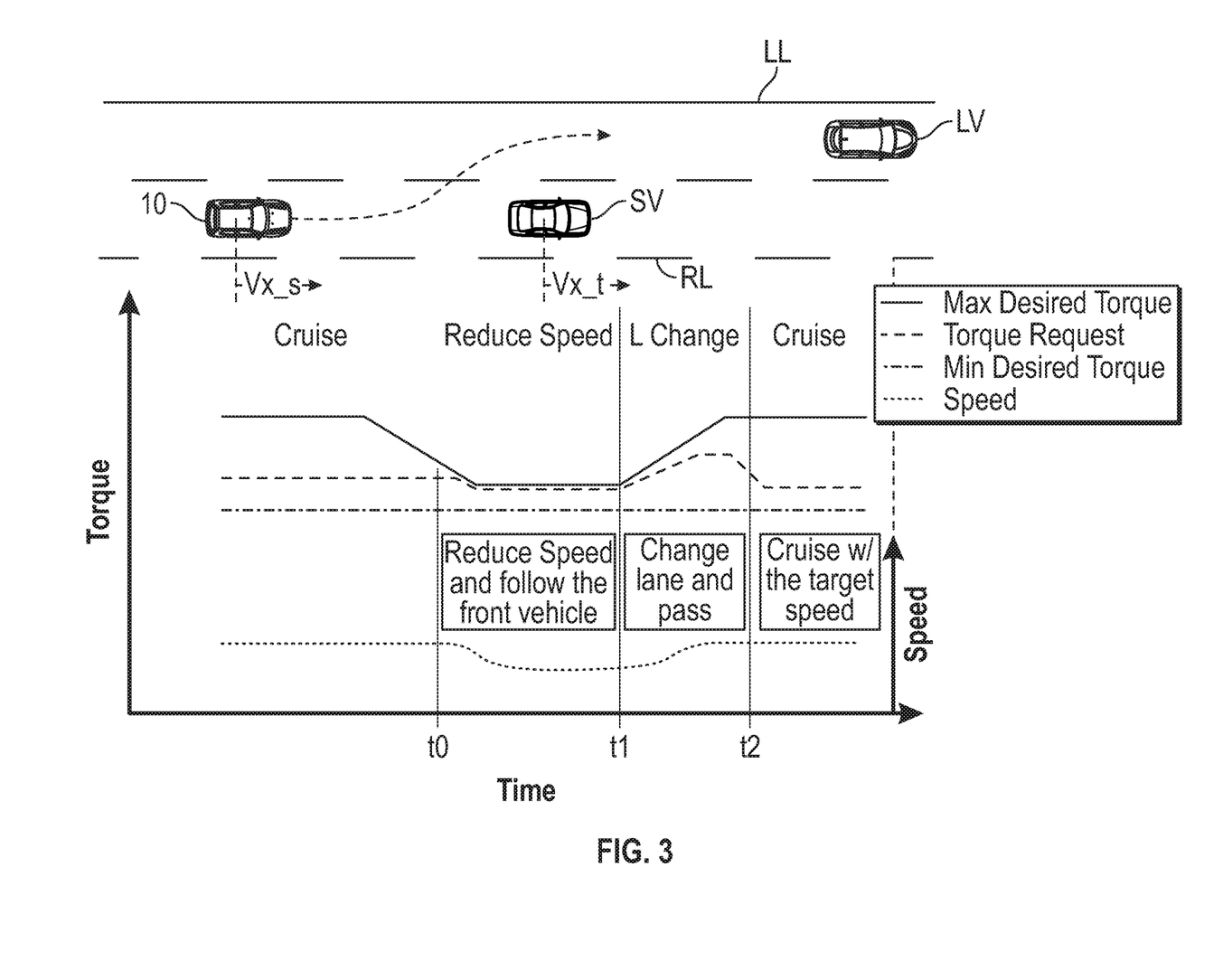
FIG. 3 is a schematic diagram of an exemplary use of the method shown in FIG. 2.

FIG. 3 shows an example of how the method 100 may be used by the vehicle 10 to defer a lane change. In this example, the vehicle 10 is cruising in the right lane RL and detects a slower vehicle SV on the left lane LL. That is, the speed of the vehicle 10 (i.e., $Vx\_s$) is greater than the speed of the slower vehicle (i.e., $Vx\_t$). In response, the planning controller 28 commands an automatic lane change to the left lane LL if the distance from the vehicle 10 to the vehicle on the left lane (i.e., left-lane vehicle LV) is greater than a predetermined distance threshold and the speed of the left-lane vehicle is greater than a predetermined speed threshold. However, as shown in the graph of FIG. 3, if the powertrain optimizer (i.e., method 100) reduces the maximum desired torque for any reason (e.g., low state of charge (SOC) of the battery; to save energy before the vehicle climbs up a long hill; the energy temperature is too high; torque reduction is due to temporary emission improvement), the planning controller 28 defers the lane change. Instead of changing lanes, the planning controller 28 decides to reduce the vehicle speed and follow the slower vehicle SV until the maximum desired torque increases again. Once the maximum desired torque is increased again, the vehicle 10 automatically changes lanes. After the automatic lane change, the vehicle 10 maintains the target speed.

Figure 4:
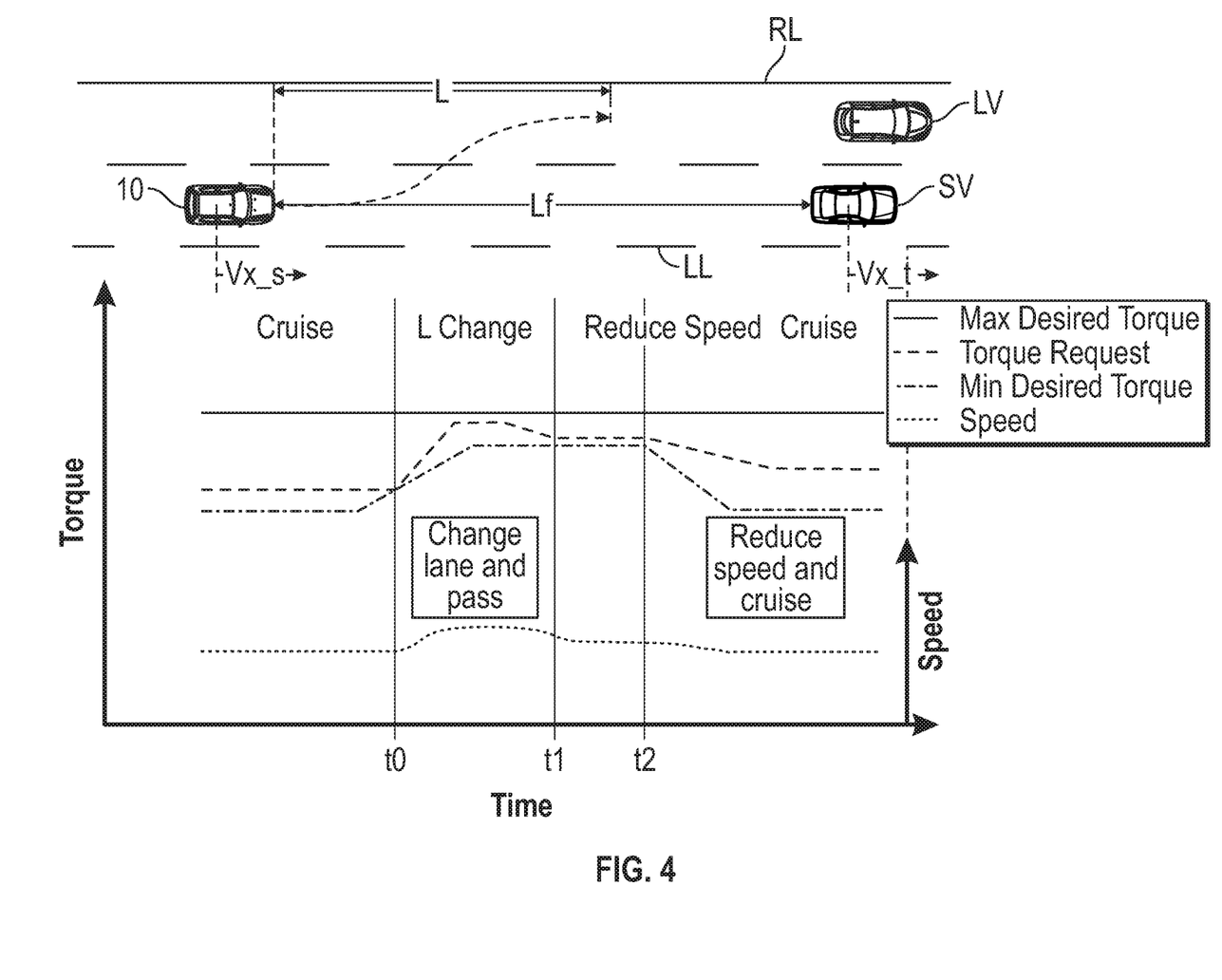
FIG. 4 is a schematic diagram of another exemplary use of the method shown in FIG. 2.

FIG. 4 shows an example of how the method 100 may be used by the vehicle 10 to perform a lane change immediately. In this example, if the minimum desired torque is increased due to any reason (e.g., too high battery SOC; too low engine temperature; there is a need to dissipate energy in the battery because of a long downhill in the near future, or an emission-related reason), a lane change is performed immediately. In this example, the vehicle 10 detects that there is a slow-moving vehicle (i.e., the slower vehicle SV) on the left lane LL way before the vehicle 10 has to reduce its speed or change lanes. In this instance, the distance from the vehicle 10 to the slower vehicle SV (i.e., distance Lf) is much greater than the distance from the vehicle 10 to the location in which speed change or lane change is desired (i.e., distance L). The planning controller 28 is then notified that the minimum desired torque is increased. The vehicle 10 detects that there are no obstructions the left lane LL. Then, the planning controller 28 decides to command the vehicle 10 to change lanes from the left lane LL to the right lane RL if the speed of the vehicle 10 is not higher than a predetermined speed threshold. Then, the vehicle 10 cruises until the minimum desired torque is decreased. Next, the planning controller 28 is notified that the minimum desired torque has decreased. Then, the vehicle 10 reduces speed and cruises.

In additional examples, by communicating the torque plan to the powertrain control system (i.e., engine controller 16 and transmission controller 18), the vehicle 10 is capable of preselecting the gear (i.e., the transmission state) when the torque demands change. This improves the driveline quality and response by allowing the powertrain to meet torque demands quicker as well as minimize driveline disturbances.

In another example, there is a torque demand at a specific time in order to match the velocity of the target vehicle coming up from behind in an adjacent lane. If the FSRACC 34 is in a headway control mode, the FSRACC 34 plans to upshift to another gear (e.g., sixth gear). Meanwhile, if the increased torque demand requires a third gear, this command cannot be executed in a single shift. Thus, in this case, the powertrain could preselect the third gear before acceleration is required.

While the best modes for carrying out the teachings have been described in detail, those familiar with the art to which this disclosure relates will recognize various alternative designs and embodiments for practicing the teachings within the scope of the appended claims. The vehicle 10 and method 100 illustratively disclosed herein may be suitably practiced in the absence of any element which is not specifically disclosed herein. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings.

The invention claimed is:

1. A method for controlling a vehicle, comprising:
   receiving, by a planning controller, a trip plan based on an input from a vehicle-operator, wherein the trip plan is indicative of a planned trip;
   determining, by the planning controller, a current location of the vehicle using a Global Navigation Satellite System (GNSS) of the vehicle;

determining, by the planning controller, a geography of the planned trip using map data from a map database;

determining, by the planning controller, a target speed profile for the vehicle as a function of the trip plan, the geography of the planned trip, and a predetermined acceleration range;

determining, by an adaptive cruise controller, a torque request as a function of the target speed profile, a predetermined torque range, and a current speed of the vehicle;

determining, by the adaptive cruise controller, an updated acceleration range as a function of a current torque capacity of the vehicle, a predetermined torque range, and a vehicle-operator target speed;

updating the target speed profile as a function of the updated acceleration range;

determining an axle torque request as a function of the torque request and an engine torque capacity of the vehicle;

determining an updated torque range as a function of the engine torque capacity of the vehicle;

updating the updated torque range as a function of the engine torque capacity of the vehicle, an engine torque capability of the vehicle, and a transmission state of a transmission of the vehicle; and controlling, by a transmission controller, the transmission of the vehicle based on the axle torque request, a current transmission output speed of the transmission, and the engine torque capacity of the vehicle.

2. The method of claim 1, wherein the geography of the planned trip includes an upcoming terrain data, and the target speed profile is determined based on the upcoming terrain data.

3. The method of claim 2, wherein the target speed profile is determined as a further function of a vehicle-operator set speed.

4. The method of claim 3, wherein controlling, by the transmission controller, the transmission of the vehicle includes generating a transmission shift command to adjust the transmission state such that the transmission operates in an updated-transmission state.

5. The method of claim 4, further comprising updating the updated torque range as a function of the engine torque capacity of the vehicle, the engine torque capability of the vehicle, and the updated-transmission state of a transmission of the vehicle.

6. The method of claim 5, further comprising:
determining a current air-fuel ratio of the vehicle; and
determining, by an engine controller, the engine torque capacity as a function of the current air-fuel ratio of the vehicle.

7. The method of claim 6, further comprising determining the engine torque capability as a function of a maximum air-fuel ratio of the vehicle.

8. The method of claim 7, further comprising generating a throttle command to control a throttle of the vehicle.

9. A vehicle, comprising:
a transmission;
a Global Navigation Satellite System (GNSS) configured to determine a current location of the vehicle;
a map database including map data;
an adaptive cruise controller in communication with the map database and the GNSS, wherein the adaptive cruise controller is programmed to:
determine the current location of the vehicle using the GNSS;
determine a geography of a planned trip using the map data;
determine a target speed profile for the vehicle as a function of the trip plan, the geography of the planned trip, and a predetermined acceleration range;
determine a torque request as a function of the target speed profile, a predetermined torque range, and a current speed of the vehicle;
determine an updated acceleration range as a function of a current torque capacity of the vehicle, the predetermined torque range, and a vehicle-operator target speed;
update the target speed profile as a function of the updated acceleration range;
determine an axle torque request as a function of the torque request and an engine torque capacity of the vehicle;
determine an updated torque range as a function of the engine torque capacity of the vehicle;
update the updated torque range as a function of the engine torque capacity of the vehicle and an engine torque capability of the vehicle; and
a transmission controller in communication with the transmission and the adaptive cruise controller, wherein the transmission controller is programmed to control the transmission of the vehicle based on the axle torque request, a current transmission output speed of the transmission, and the engine torque capacity of the vehicle.

10. The vehicle of claim 9, further comprising a planning controller programmed to receive a trip plan based on an input from a vehicle-operator, wherein the trip plan is indicative of the planned trip.

11. The vehicle of claim 10, further comprising an internal combustion engine coupled to the transmission.

12. The vehicle of claim 11, wherein the geography of the planned trip includes an upcoming terrain data, and the target speed profile is determined based on the upcoming terrain data.

13. The vehicle of claim 12, wherein the target speed profile is determined as a further function of a vehicle-operator set speed.

14. The vehicle of claim 13, wherein the transmission controller is programmed to generate a transmission shift command to adjust the transmission state such that the transmission operates in an updated-transmission state.

15. The vehicle of claim 14, wherein the adaptive cruise controller is further programmed to update the updated torque range as a function of the engine torque capacity of the vehicle, and the engine torque capability of the vehicle, and the updated-transmission state of a transmission of the vehicle.

16. The vehicle of claim 15, further comprising an engine controller programmed to:
determine a current air-fuel ratio of the vehicle; and
determine the engine torque capacity as a function of the current air-fuel ratio of the vehicle.

17. The vehicle of claim 16, wherein the engine controller is programmed to determine the engine torque capability as a function of a maximum air-fuel ratio of the vehicle, and the engine controller is programmed to generate a throttle command to control a throttle of the vehicle, and the vehicle includes a plurality of sensors, and at least one of the sensors is configured to collect dynamic traffic information and transmit the dynamic traffic information to the planning controller.

18. A vehicle, comprising:
a transmission;
an internal combustion engine coupled to the transmission;
a Global Navigation Satellite System (GNSS) configured to determine a current location of the vehicle;
a map database including map data;
an adaptive cruise controller in communication with the map database and the GNSS, wherein the adaptive cruise controller is programmed to:
  determine the current location of the vehicle using the GNSS;
  determine a geography of a planned trip using the map data, wherein the geography of the planned trip includes upcoming terrain data;
  determine a target speed profile for the vehicle as a function of the trip plan, the upcoming terrain data, a vehicle-operator set speed, and a predetermined acceleration range;
  determine a torque request as a function of the target speed profile, a predetermined torque range, and a current speed of the vehicle;
  determine an updated acceleration range as a function of a current torque capacity of the vehicle, a predetermined torque range, and a vehicle-operator target speed;
  update the target speed profile as a function of the updated acceleration range;
  determine an axle torque request as a function of the torque request and an engine torque capacity of the vehicle;
  determine an updated torque range as a function of the engine torque capacity of the vehicle;
  update the updated torque range as a function of the engine torque capacity of the vehicle, and an engine torque capability of the vehicle, and a transmission state of a transmission of the vehicle; and
a transmission controller in communication with the transmission and the adaptive cruise controller, wherein the transmission controller is programmed to control the transmission of the vehicle based on the axle torque request, a current transmission output speed of the transmission, and the engine torque capacity of the vehicle, and the transmission controller is programmed to generate a transmission shift command to adjust the transmission state such that the transmission operates in an updated-transmission state;
a planning controller programmed to generate a trip plan based on an input from a vehicle-operator, wherein the trip plan is indicative of a planned trip;
an engine controller programmed to:
  determine a current air-fuel ratio of the vehicle;
  determine the engine torque capacity as a function of the current air-fuel ratio of the vehicle;
  determine the engine torque capability as a function of a maximum air-fuel ratio of the vehicle; and
  generate a throttle command to control a throttle of the vehicle; and
wherein the adaptive cruise controller is further programmed to update the updated torque range as a function of the engine torque capacity of the vehicle, and the engine torque capability of the vehicle, and the updated-transmission state of a transmission of the vehicle.

* * * * *